No. 619,643. Patented Feb. 14, 1899.
F. C. WALTER & H. F. REPKOW.
PIPE CUTTING AND THREADING TOOL.
(Application filed Aug. 20, 1898.)
(No Model.)
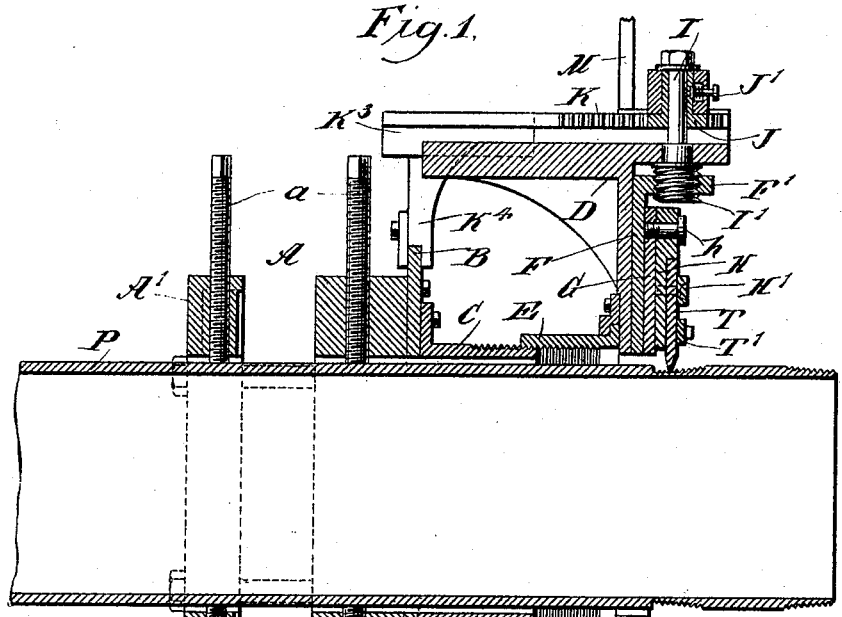
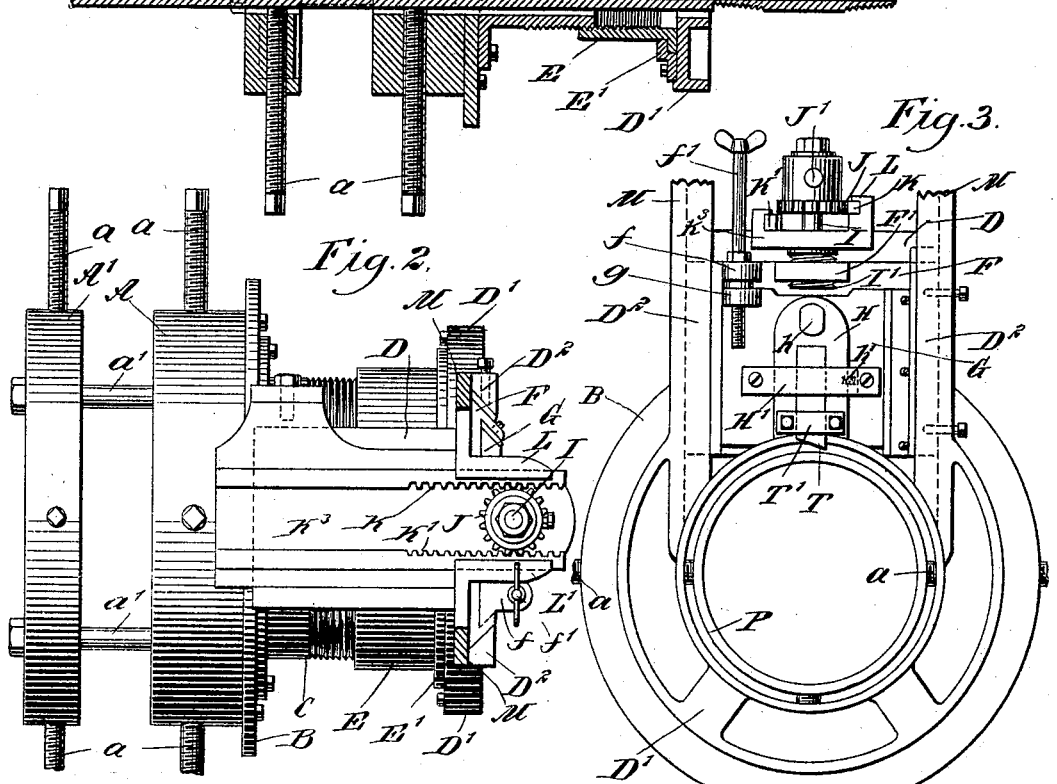
WITNESSES:
Edward Thorpe
H. L. Reynolds
INVENTORS
F. C. Walter
H. F. Repkow
BY
ATTORNEYS.

UNITED STATES PATENT OFFICE.

FERDINAND CHARLES WALTER AND HERMAN FREAD REPKOW, OF CHICAGO, ILLINOIS.

PIPE CUTTING AND THREADING TOOL.

SPECIFICATION forming part of Letters Patent No. 619,643, dated February 14, 1899.

Application filed August 20, 1898. Serial No. 689,080. (No model.)

*To all whom it may concern:*

Be it known that we, FERDINAND CHARLES WALTER and HERMAN FREAD REPKOW, of Chicago, in the county of Cook and State of Illinois, have invented a new and Improved Pipe Cutting and Threading Tool, of which the following is a full, clear, and exact description.

Our invention relates to an improvement in pipe cutting and threading tools designed for hand use in cutting and threading pipes.

The invention comprises the novel features hereinafter described and claimed.

Reference is to be had to the accompanying drawings, forming a part of this specification, in which similar characters of reference indicate corresponding parts in all the views.

Figure 1 is a longitudinal section taken through the tool and a piece of pipe upon which it is operating. Fig. 2 is a top plan view of the tool, and Fig. 3 is an end elevation of the same with the pipe in position therein.

The object of our invention is to construct a tool which may be readily used for cutting and threading pipes of varying diameter and which may be used while away from a shop, although it is a convenient tool for use in a shop where special pipe cutting and threading machinery is not available.

Our invention is an improvement upon the device shown in the Patent No. 479,892, granted August 2, 1892, to J. F. Mason. In general features it is similar to the device shown in said patent.

The device is designed to be attached directly to the piece of pipe which is to be threaded or cut off, as the case may be. The attachment of the device to the pipe is secured by means of a universal clamp, which consists of two rings A and A', connected with each other by means of bolts $a'$ and secured to the pipe by means of radial bolts $a$. This clamp is secured to the pipe in a position corresponding with the location of the thread to be cut thereon. By reason of the construction of this clamp it may be secured to pipe of considerable variation in size, and, in fact, may be secured to any pipe small enough to enter the openings in the rings A and A'.

To one side of the ring A, which will be termed the "front" side, is secured a radial flange or ring B, which projects a slight distance outside of the ring A of the clamp, being of larger diameter than the same. The projecting portion of this ring forms a guide by means of which the feeding device is actuated. To the front surface of the ring B is secured a flanged collar C, which closely surrounds the pipe-receiving opening and is exteriorly threaded.

In connection with the clamp and the threaded and flanged collar C is provided a carriage which supports the cutting-tool and the mechanism by which it is operated. This carriage, as herein shown, consists of a casting D, which in general form resembles a bracket or knee having a vertical and horizontal portion connected by a web. An interiorly-threaded collar E is adapted to screw upon the outside of the flanged collar C, and said collar is carried by a ring D', which surrounds the pipe P and forms a part of the carriage D. The collar E is secured to the ring D' by means of a ring E', which is offset so as to engage a flange upon the base of the collar E. This enables the collar E to be rigidly secured to the ring D' when desired, or by loosening the bolts which clamp the ring E' thereto the collar E may be permitted to turn, if desired.

Upon the radial portion of the carriage D are mounted two slides—a primary slide F, which is directly in contact with the carriage and is secured in place by gibs $D^2$, as clearly shown in Fig. 2, and a secondary carriage G, which is mounted to slide upon the primary carriage and is held in place by similar gibs. The primary carriage F has an arm F' extending longitudinally of the pipe at its outer end. This arm has a threaded hole passing through it and adapted to receive the threaded section I' of a radial shaft I. By rotating the shaft I the primary carriage will be moved toward or away from the pipe. Both primary and secondary carriages are provided with arms $f$ and $g$, adapted to receive an adjusting-bolt $f'$. This bolt is threaded in the arm or lug $g$ and has a swivel or thrust bearing in the arm $f$, so that by turning it the two slides will be separated or drawn together. By means of this device the two slides are separated, so as to adjust the cutting-tool nearer to the center when it is desired to operate upon a smaller pipe.

To the secondary slide G is pivoted the tool-holder H by means of a pin $h$, which passes through the outer end of the tool-holder and enters the secondary slide. This tool-holder is held against the face of the secondary slide G by means of a bar H'. The space between the bar and the slide is made sufficiently long upon one side so that the tool-holder may swing a little in that direction. Between the tool-holder and the support at this end of the bar is placed a small spring $h'$, which normally presses the tool-holder in the opposite direction. To this tool-holder is secured the cutting-tool T by means of a bar T', which tightly clamps the tool in place. The tool-holder H is preferably provided with a recess adapted to receive the tool T, which tool is a small bar having its ends sharpened to form an ordinary diamond-point tool which is adapted for cutting a thread.

The longitudinally-extended portion of the carriage D is provided with guides adapted to receive the two rack-bars K and K', which extend parallel with the direction of the pipe, but at different distances therefrom, and are adapted to be engaged by a pinion J, mounted upon the upper portion of the shaft I. The two racks K and K' form a part of a slide $K^3$, which has an arm $K^4$ extending downward toward the pipe and adapted to engage the edge of the ring B. By means of this connection with the ring B the racks K and K' are held against end motion relative to the pipe while the tool is in operation. The carriage D is, however, moved slowly along the pipe by reason of the collar E, which is attached to said carriage, being threaded and screwing upon the collar C.

The carriage D and the slides and tool carried thereby are caused to travel about the pipe by means of a handle which is attached to the carriage, as shown by the portions M thereof, which have been broken away close to the carriage. This handle extends outward in any convenient form and in any suitable direction, where it may be grasped by the hand of the user. As the carriage passes about the pipe it is gradually worked toward the clutch A, and the tool T is caused to cut a thread in the pipe of the same pitch as the threads on C and E.

The tool may be fed toward the pipe by hand by operating the threaded rod $f'$, or it may be fed automatically by the revolution of the shaft I. This shaft is revolved by engagement of the pinion J thereon with one of the racks K or K'. The pinion J may be clamped to the shaft or released therefrom by means of a spring-held pin J'. By the same means the pinion may be raised so as to engage with the rack K or lowered so as to engage with the rack K'. By withdrawing the pin the pinion may be freed from the shaft and the automatic feed mechanism thus thrown out of action.

As the carriage D travels with the collar E toward the clutch the rack when in engagement with the pinion will cause the shaft I to be turned. This by the engagement of the threaded section I' with the arm F' of the primary slide will cause the tool T to be fed toward the pipe. By this means a taper-thread may be cut upon a pipe and a joint thus formed which will remain tight. The tool may also be fed away from the pipe by properly adjusting the connection of the pinion with the rack in accordance with the direction in which the tool is turned about the pipe.

The device may be used for cutting either right or left handed threads by removing the collars C and E and substituting for the same collars similarly threaded, but with the threads cut in the opposite direction.

The device may be used for cutting off a piece of pipe by loosening the collar E, so that it will not turn with the carriage. By this means the carriage will be held in one position relative to the pipe, and the cutting-tool may be fed inward by hand until the pipe has been cut off.

By mounting the tool T upon a swinging tool-holder H the tool is permitted to swing backward and away from the pipe whenever the device is turned backward. This prevents the point of the tool from being broken by a backward movement of the tool about the pipe.

By means of the automatic feeding mechanism shown a perfect taper-thread may be cut upon the pipe, and consequently a tight joint may be made.

As the perfection of work is not dependent upon the judgment of an operator, good work may be accomplished by this tool in the hands of an ordinary or unskilled mechanic.

Having thus described our invention, we claim as new and desire to secure by Letters Patent—

1. A pipe threading and cutting tool, comprising a base adapted to be secured to the pipe and having a threaded sleeve or collar surrounding the pipe, a tool-carriage having a threaded engagement with said sleeve and adapted to be revolved about the pipe, a slide mounted radially on the carriage and carrying a cutting-tool, a shaft mounted to turn in the carriage and having threaded engagement with the slide, a pinion fixed to the shaft, and a rack engaging the pinion and supported from the base.

2. A pipe threading and cutting tool, comprising a base adapted to be secured to the pipe and having a threaded sleeve or collar surrounding the pipe, a tool-carriage having a threaded engagement with said sleeve and adapted to be revolved upon the pipe, a slide mounted radially on the carriage and carrying a cutting-tool, a shaft mounted to turn in the carriage and having threaded engagement with the slide, a pinion longitudinally adjustable upon the shaft, two racks at different levels and upon opposite sides of the pinion and adapted to engage therewith, and means for engaging the racks with the base.

3. A pipe threading and cutting tool, adapted to be secured to the pipe and having a threaded sleeve or collar surrounding the pipe, a tool-carriage having a threaded engagement with said sleeve and adapted to be revolved about the pipe, a slide mounted radially on the carriage, a block pivoted by one end on the slide to swing laterally or in a plane perpendicular to the pipe-axis and provided with means for securing a cutting-tool thereto, a guard or retaining bar embracing the swinging end of the block, and means for automatically feeding the slide and tool, actuated by the longitudinal feed of the carriage.

4. A pipe threading and cutting tool, comprising a base adapted to be secured to the pipe and having a threaded sleeve surrounding the pipe, a tool-carriage having a threaded engagement with said sleeve and adapted to be revolved about the pipe, a slide mounted radially on the carriage, a block pivoted by one end on the slide and provided with means for securing a cutting-tool thereto, guards for the swinging end of the block, a shaft mounted to turn in the carriage and having threaded engagement with the slide, a pinion longitudinally adjustable upon the shaft, two racks at different levels and upon opposite sides of the pinion and adapted to engage the same, and means for connecting the racks with the base.

5. A pipe threading and cutting tool, comprising a clamp adapted to be secured to the pipe, having a threaded sleeve and a radial flange surrounding the pipe, a carriage having a threaded sleeve adapted to engage the first sleeve, a handle attached to the carriage, a radial slide mounted upon the carriage and adapted to carry the cutting-tool, a longitudinal feed-slide mounted upon the tool-carriage and slidingly engaging the radial flange, a radially-extending shaft mounted to turn in the carriage and having a threaded section engaging the radial slide, a pinion on said shaft, and a rack on the longitudinal slide, engaging said pinion.

6. A pipe threading and cutting tool, comprising a clamp adapted to be secured to the pipe, having a threaded sleeve and a radial flange surrounding the pipe, a carriage having a threaded sleeve adapted to engage the first sleeve, a handle attached to the carriage, primary and secondary slides radially mounted upon the carriage and first slide, an adjusting-bolt connecting the two slides, a tool-holder mounted on the secondary slide, a longitudinal feed-slide mounted upon the carriage and slidingly engaging the radial flange, a radially-extending shaft mounted to turn in the carriage and having a threaded section engaging the primary slide, a pinion on said shaft, and a rack on the longitudinal slide and engaging said pinion.

FERDINAND CHARLES WALTER.
HERMAN FREAD REPKOW.

Witnesses:
CHARLES FRANK,
WILHELM REPKOW.